Nov. 25, 1969     D. E. BLOXSOM, JR., ETAL     3,479,857
MICROMETEORITE SHOWER CREATING APPARATUS AND METHOD
Filed July 20, 1965
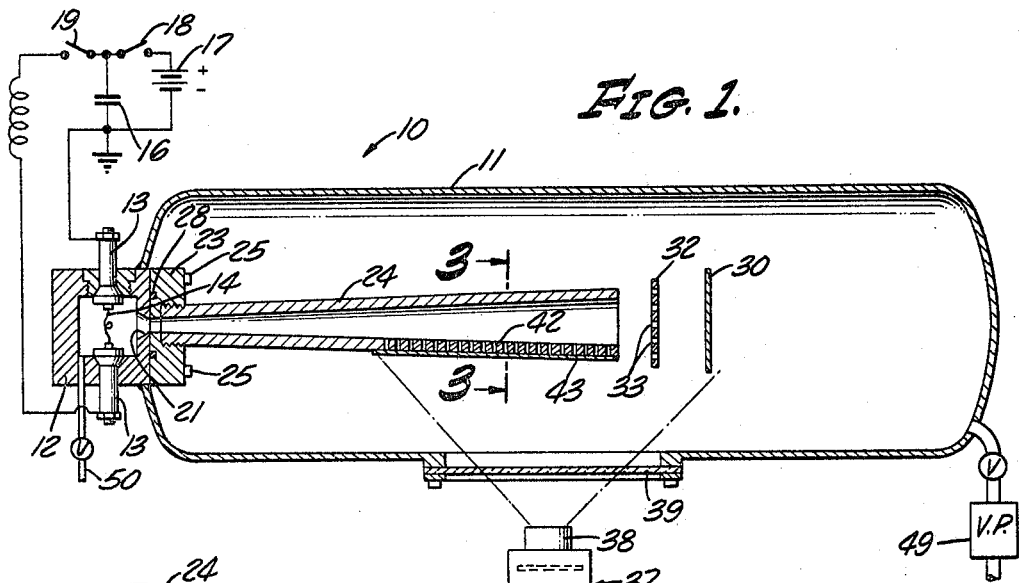
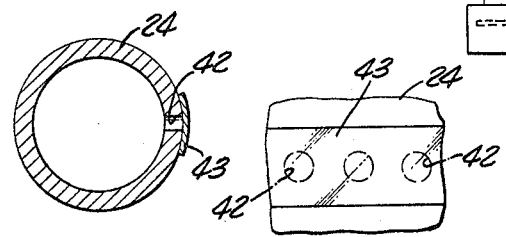
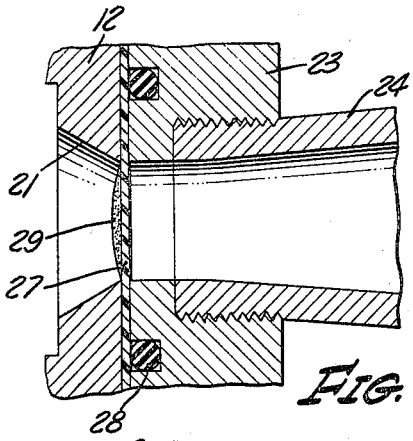
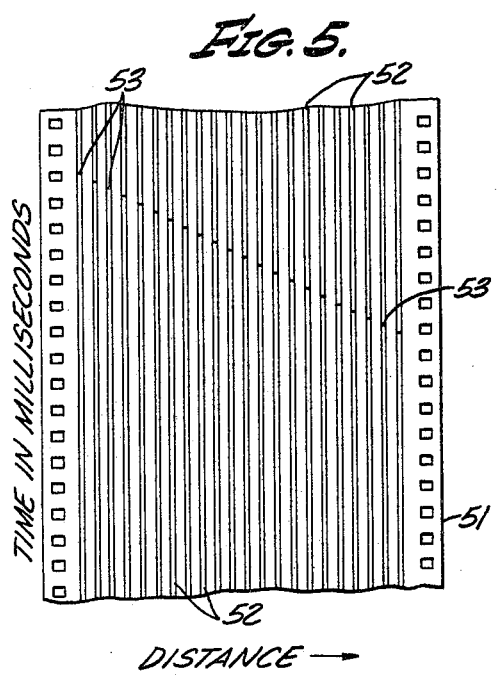
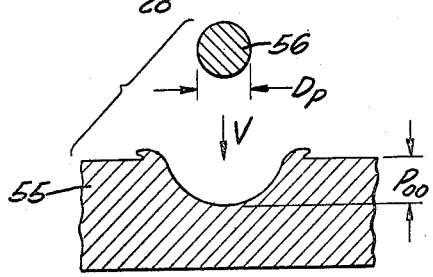
DANIEL E. BLOXSOM, JR.
BARRY V. RHODES
INVENTORS.
BY
ATTORNEY United States Patent Office 3,479,857
Patented Nov. 25, 1969

1

3,479,857
MICROMETEORITE SHOWER CREATING APPARATUS AND METHOD
Daniel Edgar Bloxsom, Jr., 523 S. Lucerne, Los Angeles, Calif. 90005, and Barry V. Rhodes, 22358 Baltar St., Canoga Park, Calif. 91304
Filed July 20, 1965, Ser. No. 473,472
Int. Cl. G01n 3/62; G01m 9/00; G01w 1/00
U.S. Cl. 73—12
12 Claims

ABSTRACT OF THE DISCLOSURE

A method and apparatus is provided for generating a shower of micrometeorites or the like particles traveling at hypersonic velocity in space environmental conditions and for determining the effect of impact of such particles on another object. Particle velocities in the range of 120,000 feet per second are achievable in the laboratory using relatively simple inexpensive equipment and a low molecular weight gas propellant effective to accelerate the particles by drag effect as the hot pressurized gas expands into a vacuum. The particle velocity is determined by smear camera technique and the impact area for the particles after being accelerated to hypersonic velocity may be controlled by locating a grid in the path of the particles.

---

This invention relates to means for determining the effects of the impact on various objects and materials by particles traveling at hypersonic velocities and more particularly upon apparatus and a method of creating a shower of micrometeorite particles in space environmental conditions and a technique for determining the effect of impact of such particles on various objects and materials.

Current efforts to send both manned and unmanned equipment into space necessitates accurate knowledge respecting the effect of contact of such equipment with high velocity micrometeorite particles. Obtaining such information and test data heretofore has been handicapped by the unavailability of equipment capable of accelerating particles to the hyper-velocities at which such particles are known to travel in space.

The present invention provides a technique and a micrometeorite accelerator designed to be operated in the laboratory under precisely controlled conditions and capable of simulating velocities and pressure conditions known to exist in outer space. Depending upon the size of the particles being accelerated, the technique and apparatus of the present invention has the capability of accelerating such particles to 120,000 feet per second or in excess of 85,000 miles per hour in a test chamber maintained at a space environment pressure of $10^{-6}$ atmospheres. This is accomplished using a suitable instantaneous high intensity heat source, as for example, an electric arc discharge to heat gas, as hydrogen, in a closed chamber to a temperature of 30,000° K. and a pressure of 25,000 pounds per square inch. This hot gas is then utilized to accelerate, by the highly effective and efficient drag phenomena, micrometeorite particles to hypervelocity as the gas is expanded into a vacuum through a diverging conical nozzle. Preferably these particles are accelerated to the aforementioned high velocities by a gas of minimum molecular weight since greatly higher velocities are achieved than when using a heavier gas. The use of a selector grid in the path of particle travel permits the operator to select a particular particle for impact on a designated area of the test target, an operation which is carried out with the aid of smear camera technique to monitor the test. By means of this camera equipment the particle velocity is observed and measured. The results produced by the impact are then checked after each run by a comparison measurement with a suitable control, such as the impact cavity produced in a similar test made using glass spheres and a target of sheet aluminum.

Accordingly it is a primary object of the present invention to provide apparatus and a method of determining the impact effect of hypervelocity micrometeorite showers on various objects and materials.

Another object of the invention is the provision of apparatus for accelerating microparticles to hypersonic velocities in simulated space environment pressure conditions.

Another object of the invention is the provision of equipment suitable for use in the laboratory and operable to subject different objects and materials to impact by particles traveling in a vacuum at hypersonic velocities and including means for determining the velocity of travel immediately prior to impact with the test specimen.

Another object of the invention is the provision of means for accelerating a plurality of microparticles to hypersonic velocity and for selecting a particular particle for impact on a designated area of the target specimen.

Another object of the invention is the provision of means and a method of creating an artificial shower of hypervelocity micrometeorites utilizing as the accelerating principle the drag of channelized rapidly expanding super-heated high pressure gas, and more particularly a gas having a low molecular weight.

Another object of the invention is the provision of a high efficiency mode of accelerating an object to high velocity by immersing the object in a rapidly expanding stream of super-heated super-pressurized gas having a high speed of sound.

These and other more specific objects will appear upon reading the following specification and claims and upon considering in connection therewith the attached drawings to which they relate.

Referring now to the drawings, in which a preferred embodiment of the invention is illustrated.

FIGURE 1 is a generally schematic view of apparatus useable in the laboratory for creating a shower of micrometeorite particles and impinging the same upon a target specimen;

FIGURE 2 is a fragmentary view on an enlarged scale showing one mode of releasing the particles to be accelerated into a high velocity gas stream;

FIGURE 3 is a cross-sectional view taken along line 3—3 on FIGURE 1;

FIGURE 4 is a fragmentary view on an enlarged scale taken along one side of the accelerating nozzle;

FIGURE 5 is a view of a length of film showing a typical trace of a particle as it accelerates along the nozzle enroute to impact with the test specimen; and FIGURE 6 is a cross-sectional schematic view of a crater produced in aluminum by a glass sphere after being accelerated to a known hypersonic velocity by the apparatus of this invention.

Referring to FIGURE 1 there is shown one preferred embodiment of apparatus designated generally 10 for practicing this invention. This apparatus comprises a high strength vacuum chamber 11 having a thick-walled bomb chamber 12 at one end for generating high pressure gas used to accelerate the particles to hypervelocity. Suitably supported in diametrically opposed sides of chamber 12 are a pair of electric arc electrodes enshrouded in insulated mounting sleeves 13, 13. Interconnecting the inner ends of these electrodes is a destructible teaser wire 14 used to initiate the arc between the electrodes. A very brief high intensity arc is created between the electrodes by the use of a capacitance storage bank and indicated schematically at 16 and chargeable from a suitable power source, such as a battery 17 and switch 18, it being understood that the firing switch 19 is open during the charging operation.

The face of bomb 12 opening into the interior of vacuum chamber 11 is provided with a port 21 which converges into the throat of a venturi passage extending generally axially of vacuum chamber 11. Detachably secured over port 21 is a mounting plate 23 for a long nozzle 24 forming the discharge portion of the venturi. The nozzle mounting plate 23 is secured in place by means of cap screws 25 and these serve additionally to secure the thin destructible diaphragm 27 in an airtight manner over the smaller end of port 21. Desirably an O-ring 28 carried in a groove on the inner face of mounting plate 23 assures a seal and is held pressed against the outer face of diaphragm 27.

Diaphragm 27 may be formed of plastic material or the like which readily disintegrates into particles the craters of which are easily distinguished from those produced by the micrometeorite particles proper on the test specimen. Secured to either the inner or outer central area of diaphragm 27 is one or more micrometeorite particles 29 formed from the material selected to be accelerated to hypersonic velocity for impact on the specimen target. The number and size of these particles as well as the constituent material can vary widely and have a density from 18 to 0.5 gram per cubic centimeter. The particle size may vary over a wide range, as 10 to 500 microns, although even larger sizes can be employed. The particles to be accelerated may be secured to the surface of diaphragm 27 in any suitable manner as by thin plastic tape, adhesive material or otherwise.

Target specimen 30 may consist of any material either metallic or nonmetallic and may be of any shape, thickness or configuration. Frequently the test specimen consists of a plaque or panel of the material to be tested and this is suitably supported by wires or the like arranged crosswise of chamber 11.

It frequently happens that the operator wishes to have one or a limited number of particles strike a particular area of the target. This may be accomplished by supporting a selector grid 32 between the end of nozzle 24 and target 30. Grid 32 is formed of material which will not be penetrated by the particles and is formed with a limited number of small ports 33. These ports are sufficiently large as to freely pass a limited number of the particles. In consequence the majority of the particles impact upon the selector grid 32 to one side of ports 33 and never reach specimen 30.

The velocity attained by the particles immediately prior to impact may be determined by use of a smear camera technique using a camera 37 located exteriorly of chamber 11 with its lens 38 trained through a high pressure window 39 positioned opposite the outlet end of nozzle 24, selector grid 32 and specimen 30. To permit obtaining images of particles passing along nozzle 24 its side is hereshown as provided with a series of small apertures 42 and preferably closed on their outer ends by a transparent window formed of high strength transparent plastic tape 43. It is found that openings approximately ½ inch in diameter and spaced apart by a like distance serves very well.

With the foregoing description in mind of suitable equipment for practicing the present invention it is desirable to point out certain alternate practices and to discuss in somewhat greater detail certain attributes and important characteristics of the operating principles and to contrast these favorably with other modes of accelerating particles such as the commonly employed ballistic method. For example, although an electric arc has been illustrated and described as a suitable method of heating the gas it will be understood that various other methods are also suitable and the electric arc method is merely a relatively simple and easily controlled method readily practiced in any laboratory. Various chemical modes of obtaining massive fast-action heating are equally suitable and may be used.

It is also desired to point out that a particularly important factor, particularly where very high acceleration rates are of importance, as they usually are, is the selection of a gas having a maximum speed of sound characteristic, a property directly associated with the molecular weight of the gas. Maximum acceleration is obtained using a gas having a speed of sound of approximately 4,000 feet per second under standard conditions as do such light gases as helium and hydrogen. In contrast, air, for example, has a speed of sound of approximately 1,000 feet per second under standard conditions, or only about ¼ as great as hydrogen or helium. It is readily seen therefore that it is highly advantageous to use a gas having a minimum molecular weight if the objective is to obtain maximum acceleration.

Another feature of importance is the fact that the present acceleration technique employs the principle of drag effect as the driving force. In other words the particle to be accelerated is suspended and completely engulfed by the highly pressurized, rapidly expanding gas. In consequence the pressure on all portions of the particle are substantially equal, both initially and throughout the acceleration period. As a result, there is no tendency to fragment the particle, to distort it, or subject it to shock, or vibration or other forces other than the effect of friction of the gas. These various factors characterizing the present accelerating mode contrast sharply with other modes proposed heretofore. For example, according to the ballistic mode of acceleration, the object to be accelerated is supported in an open-ended bore forward of an explosive charge or other means for expanding highly pressurized gas against the inner end of the object. As will be appreciated, the high pressure generated and constituting the accelerating force is applied suddenly to a limited area of the object. This force is absorbed in part by deformation of the object, in part by friction losses between the object and the supporting bore wall, and in part in work expended producing acceleration. These pressures can distort or fragment the particle and are basically and fundamentally incapable of producing the high rate of acceleration or the terminal velocities easily obtained by use of the technique of this invention.

In the use of the described accelerator apparatus particles of the material to be accelerated, such as tungsten, may be introduced into the expanding gas stream in any suitable manner. One convenient mode involves securing the particles to the surface of diaphragm 27 by pressure sensitive adhesive tape, following which the diaphragm is clamped in place between the outer side of bomb 12 and nozzle supporting plate 23. Specimen plate 30 and selector grid 32 are then suspended in the positions indicated opposite the discharge end of nozzle 24 and transparent cover plate 39 of the vacuum chamber is secured in place. Vacuum pump 49 is then operated to pull a high vacuum on chamber 11. Meanwhile switch 18 is closed to store a high charge on a massive bank of capacitors 16.

Immediately before starting the test, a suitable gas, as hydrogen under relatively low pressure, is introduced into the bomb chamber through conduit 50. The motor of the smear camera is then started to feed the film strip 51 past the lens in accordance with practices well known to those familiar with the use of smear camera technique. Switch 19 is then closed to release the high charge on the capacitors through teaser 14, instantly destroying this wire and creating an intense arc between electrodes 13, 13. The high power present in this arc is dissipated into the hydrogen gas thereby substantially instantly raising its temperature to approximately 30,000° K. and a pressure of 25,000 pounds per square inch. This instantly destroys diaphragm 27 and allows this super-heated super-pressurized gas to expand into the vacuum condition of chamber 11 through nozzle 24. In so doing the gas and the particles 28 suspended in the throat of the nozzle are accelerated to hypervelocities toward target 30. Only a few of these particles are aligned with the minute ports 33 in selector grid 32 and pass through these ports into impact with test specimen 30.

The entire test following closing of switch 19 occurs in a few microseconds. The arc and the high temperature produced within the bomb chamber illuminates the interior of nozzle 24 with the result that narrow bands 52 of exposed film are produced on the film and formed by the lighted interior of the nozzle and visible to the camera through the windows of ports 42. The movement of a particle past the ports also leaves a characteristic telltale image 53 on the film. By the time this particular particle is opposite the next port the constantly moving film has changed its position with the result that the particle intercepts the next light band 52 in a different position. The trace left by a single particle and represented by the images 53 is shown in FIGURE 5 and it will be understood that there are a number of such traces each representing a different particle and having its own distinctive trace path and from which the velocity of that particle just prior to impact with the target can be computed. It is pointed out that the width of the film represents distance traveled whereas the margin is preferably provided with a time scale calibrated in milliseconds.

After the described test run, specimen 30 is removed from the test chamber and the depth of the craters produced in its surface are analyzed and compared with the crater formed in aluminum by a glass sphere of known size and traveling at the same velocity. A typical crater produced by a glass particle in aluminum 55 is illustrated in FIGURE 6. Thus a glass sphere 56 having a diameter $Dp$ and traveling at a hypersonic velocity V made a crater having the typical configuration illustrated in FIGURE 6 and to a depth of $Poo$. These values are then compared with the values and results obtained when a particle of tungsten of known size and accelerated to a measured velocity impacted to a measured depth in the surface of the test specimen.

While the particular micrometeorite shower creating apparatus and method herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. Apparatus for subjecting an object to a shower of micrometeorites at hypervelocity comprising, chamber means, means for evacuating said chamber means to a high vacuum condition, a high-strength small volume enclosure opening into said chamber through venturi-shaped nozzle means located principally within said chamber and having a restricted throat normally sealed closed by frangible diaphragm means, means for supporting a test object in the path of gas flow discharging from said nozzle means, means supporting micrometeorites opposite one face of said diaphragm means, means for charging said enclosure with a non-conductive gas having a molecular weight of the order of one or two, and means for substantially instantaneously releasing stored electrical energy into said charge of gas to increase the temperature and pressure thereof enormously thereby to disintegrate said frangible diaphragm and create a hypervelocity stream of gas along said nozzle means effective to entrain said micrometeorites by drag effect and to accelerate the same to a hypervelocity of at least 75,000 feet per second.

2. Apparatus as defined in claim 1 characterized in that said chamber means is provided with window means opposite one side of said nozzle means, a series of holes extending along said nozzle means on the side thereof facing said window means opening radially into said nozzle means in a plane passing through said window means and adapted for use with high speed camera means located exteriorly of said window means in determining the increase in velocity of said micrometeorites as the same are accelerated past respective ones of said series of holes.

3. Apparatus as defined in claim 1 characterized in the provision of reticulated grid means positioned in the path of flow of the micrometeorites and effective to bar the passage of all except those micrometeorites which pass through openings in said grid means.

4. Apparatus as defined in claim 2 characterized in the provision of thin transparent coverings for said series of holes in the sidewall of said nozzle means.

5. That method of accelerating a micro particle to hypervelocity in excess of 75,000 feet per second which comprises, charging a small strong-walled chamber having an efficient gas expansion passage sealed closed by a frangible diaphragm with a gas having a molecular weight not substantially greater than 2 and under relatively low pressure, suddenly heating said captive gas to raise the same to super-temperature and super-pressure adequate to disintegrate said diaphragm, expanding said hot pressurized gas through said efficient gas expansion passage into a vacuum of the order of a few microns while engulfing therein the micro particle to be accelerated, and utilizing the drag effect of said expanding gas on the engulfed micro particle to accelerate the same to a hypervelocity in excess of 75,000 feet per second toward an object aligned with said passage while measuring the acceleration of said micro particle.

6. That method of accelerating a micro particle as defined in claim 5 characterized in the step of heating said captive gas substantially instantaneously by creating a massive electric arc therethrough thereby heating it to a temperature of at least 25,000° K. and raising its pressure to more than 20,000 p.s.i.

7. That method of accelerating a micro particle as defined in claim 5 characterized in the step of supporting a micro particle in the path of gas issuing through said efficient gas expansion passage upon disintegration of said frangible diaphragm whereby the micro-particle is completely surrounded by said gas under a pressure differential lengthwise of the path of movement of said micro particle whereby the expanding stream of gas issuing through said efficient gas expansion passage acts to accelerate the micro particle to hypervelocity in said stream of gas without injury to the micro-particle.

8. Apparatus for producing an instantaneous momentary shower of micro particles accelerated to hypervelocity in a non-conductive stream of gaseous fluid, said apparatus comprising, chamber means connected with means for evacuating the same to a pressure of a few microns, a small high-strength enclosure in communication with said chamber means through a long venturi-shaped nozzle, frangible diaphragm means sealing said nozzle closed, means supporting micro particles closely adjacent one face of said diaphragm means, means for charging said enclosure with a fluid in gaseous phase having a molecular weight of not materially in excess of 2, means for supporting a test object in said chamber means in axial alignment with the discharge end of said nozzle, means for substantialy instantaneously raising said gaseous fluid to a supertemperature and a superpressure thereby to disintegrate said diaphragm means and release said gas suddenly into said nozzle, and said gaseous fluid being effective while expanding therethrough into said evacuated chamber to engulf said micro particles and accelerate the same by drag effect to a hypervelocity substantially in excess of 100,000 feet per second.

9. That method of creating a shower of micrometeorite-like particles traveling at hypervelocity and utilizing the same to test the impact resistance of an object to such a shower, said method comprising, supporting micrometeorite-like particles of a few microns in size crosswise of a high efficiency gas expansion passage leading from a small chamber charged with gas in its normal gaseous phase having a molecular weight of the order of 1 or 2 and which gas expansion passage is closed downstream from said micrometeorites by frangible diaphragm means, substantially instantaneously heating said captive gas to a super-temperature and a super-pressure thereby suddenly to disintegrate said diaphragm, and utilizing the escape of the high pressure gas through said gas expansion passage to engulf and by drag effect to accelerate said micrometeorite-like particles to hypervelocity in excess of 50,000 feet per second onto a test object supported in a vacuum opposite the discharge end of said gas expansion passage.

10. The method defined in claim 9 characterized in the step of locating a reticulated barrier screen in the path of said micrometeorite-like particles and effective to bar passage of particles which do not pass through openings in said barrier screen.

11. The method defined in claim 9 characterized in the step of making a series of successive photo images representing the velocity of the particles prior to impact with the object under test.

12. That method of subjecting an object to impact by micro particles traveling at hypervelocity which comprises supporting the object under test within a sealed chamber, drawing a high vacuum on said chamber to evacuate the same to a pressure of a few microns, charging a strong-walled chamber with pressurized fluid in its normal gaseous phase having a molecular weight of the order of one or two and which chamber has a high efficiency gas expansion passage closed by a burst diapragm separating said evacuated chamber from said gas-charged chamber, said burst diaphragm being adapted to disintegrate when the temperature and pressure of said gas charge is suddenly increased, supporting a plurality of micro particles to be accelerated adjacent said diaphragm and of a few microns in size, applying heat suddenly to the gas in said sealed chamber to raise its temperature and pressure sufficiently to disintegrate said burst diaphragm and produce a hypervelocity stream of gas expanding through said gas expansion passage and effective to accelerate said micro particles into said evacuated chamber toward an object therein at hypervelocity very substantially in excess of 50,000 feet per second.

References Cited

UNITED STATES PATENTS

| | | | |
|---|---|---|---|
| 2,995,035 | 8/1961 | Bloxsom et al. | 73—147 |
| 3,130,575 | 4/1964 | Rogers | 73—12 |
| 3,182,496 | 5/1965 | Holderer | 73—147 |
| 3,267,720 | 8/1966 | Escallier et al. | |
| 2,899,864 | 8/1959 | Bloxsom | 89—7 |
| 3,148,587 | 9/1964 | Melhart | 89—8 |
| 3,295,412 | 1/1967 | Morley et al. | 89—8 |

RICHARD C. QUEISSER, Primary Examiner

J. W. WHALEN, Assistant Examiner

U.S. Cl. X.R.

73—147, 170

UNITED STATES PATENT OFFICE
CERTIFICATE OF CORRECTION

Patent No. 3,479,857                                November 25, 1969

Daniel Edgar Bloxsom, Jr., et al.

It is certified that error appears in the above identified patent and that said Letters Patent are hereby corrected as shown below:

Column 6, line 37, after "expansion" insert -- long venturi-shaped --.

Signed and sealed this 10th day of November 1970.

(SEAL)
Attest:

Edward M. Fletcher, Jr.                      WILLIAM E. SCHUYLER, JR.
Attesting Officer                                     Commissioner of Patents